United States Patent
Pietschmann

(10) Patent No.: US 9,804,825 B2
(45) Date of Patent: Oct. 31, 2017

(54) CONTROL UNIT FOR A MOTOR VEHICLE, PROGRAMMING UNIT AND PROGRAMMING SYSTEM

(71) Applicant: Bayerische Motoren Werke Aktiengesellschaft, Munich (DE)

(72) Inventor: Ingolf Pietschmann, Pfaffenhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 112 days.

(21) Appl. No.: 14/158,432

(22) Filed: Jan. 17, 2014

(65) Prior Publication Data

US 2014/0136017 A1    May 15, 2014

Related U.S. Application Data

(63) Continuation of application No. PCT/EP2012/062977, filed on Jul. 4, 2012.

(30) Foreign Application Priority Data

Jul. 19, 2011 (DE) ........................ 10 2011 079 402

(51) Int. Cl.
*G06F 7/00* (2006.01)
*H04L 29/06* (2006.01)
*G06F 9/445* (2006.01)

(52) U.S. Cl.
CPC .................. *G06F 7/00* (2013.01); *G06F 8/65* (2013.01); *H04L 29/06* (2013.01)

(58) Field of Classification Search
None
See application file for complete search history.

(56) References Cited

U.S. PATENT DOCUMENTS 5,523,948 A    6/1996 Adrain
7,594,017 B1    9/2009 DiValentino
(Continued)

FOREIGN PATENT DOCUMENTS

CN    101135905 A    3/2008
CN    101369153 A    2/2009
(Continued)

OTHER PUBLICATIONS

Fielding et al., "Hypertext Transfer Protocol—HTTP/1.1 (rfc 2616)", Standard Track, Jun. 1999 (two (2) pages).
(Continued)

*Primary Examiner* — Rami Khatib
*Assistant Examiner* — Gerrad A Foster
(74) *Attorney, Agent, or Firm* — Crowell & Moring LLP

(57) ABSTRACT

A control unit for a motor vehicle includes a central processing unit, a communication interface and a memory for storing program data of respective control programs. For programming the control unit with program data, which are stored in a specified manner in the memory, the control unit is operatively configured for supporting a specified set of protocols and for reading-in and analyzing a program data updating prompt for a control program to be updated, which prompt is provided at the communication interface. The updating prompt includes a first indicator representing conceivable protocols usable for programming with updated program data. The control unit, as a function of the first indicator, determines a second indicator, which represents that protocol from the set usable for programming of the control unit with the updated program data. The control unit sends, in response to the program data updating prompt, a program data request, which includes the second indicator.

4 Claims, 1 Drawing Sheet

(56) References Cited

U.S. PATENT DOCUMENTS

| | | | |
|---|---|---|---|
| 2005/0172099 A1* | 8/2005 | Lowe | G06F 12/1027 711/207 |
| 2008/0059806 A1 | 3/2008 | Kishida et al. | |
| 2008/0195299 A1* | 8/2008 | Barnicle et al. | 701/115 |
| 2010/0262334 A1* | 10/2010 | Yoshiyama | G05B 19/0426 701/31.4 |
| 2011/0093632 A1 | 4/2011 | Aue | |
| 2011/0307336 A1 | 12/2011 | Smirnov et al. | |
| 2012/0191871 A1 | 7/2012 | Ha | |
| 2012/0196588 A1* | 8/2012 | Shah | H04W 8/22 455/419 |

FOREIGN PATENT DOCUMENTS

| | | |
|---|---|---|
| CN | 101432708 A | 5/2009 |
| CN | 101727095 A | 6/2010 |
| CN | 102081394 A | 6/2011 |
| DE | 10 2006 019 305 A1 | 10/2007 |
| DE | 10 2009 019 817 A1 | 12/2009 |
| EP | 2 241 479 A1 | 10/2010 |
| WO | WO 2010/124775 A1 | 11/2010 |
| WO | WO 2010/143910 A2 | 12/2010 |

OTHER PUBLICATIONS

International Search Report dated Nov. 7, 2012 (three (3) pages).

German Search Report dated Nov. 15, 2011 w/ partial English translation (ten (10) pages).

English translation of International Preliminary Report on Patentability including Written Opinion (PCT/ISA/237) dated Jan. 30, 2014 (Eight (8) pages).

Chinese Office Action issued in counterpart Chinese Application No. 201280035431.0 dated Sep. 21, 2016 with English translation (Eighteen (18) pages).

English translation of Chinese-Language Office Action issued in counterpart Chinese Application No. 201280035431.0 dated Feb. 3, 2016 (5 pages).

* cited by examiner

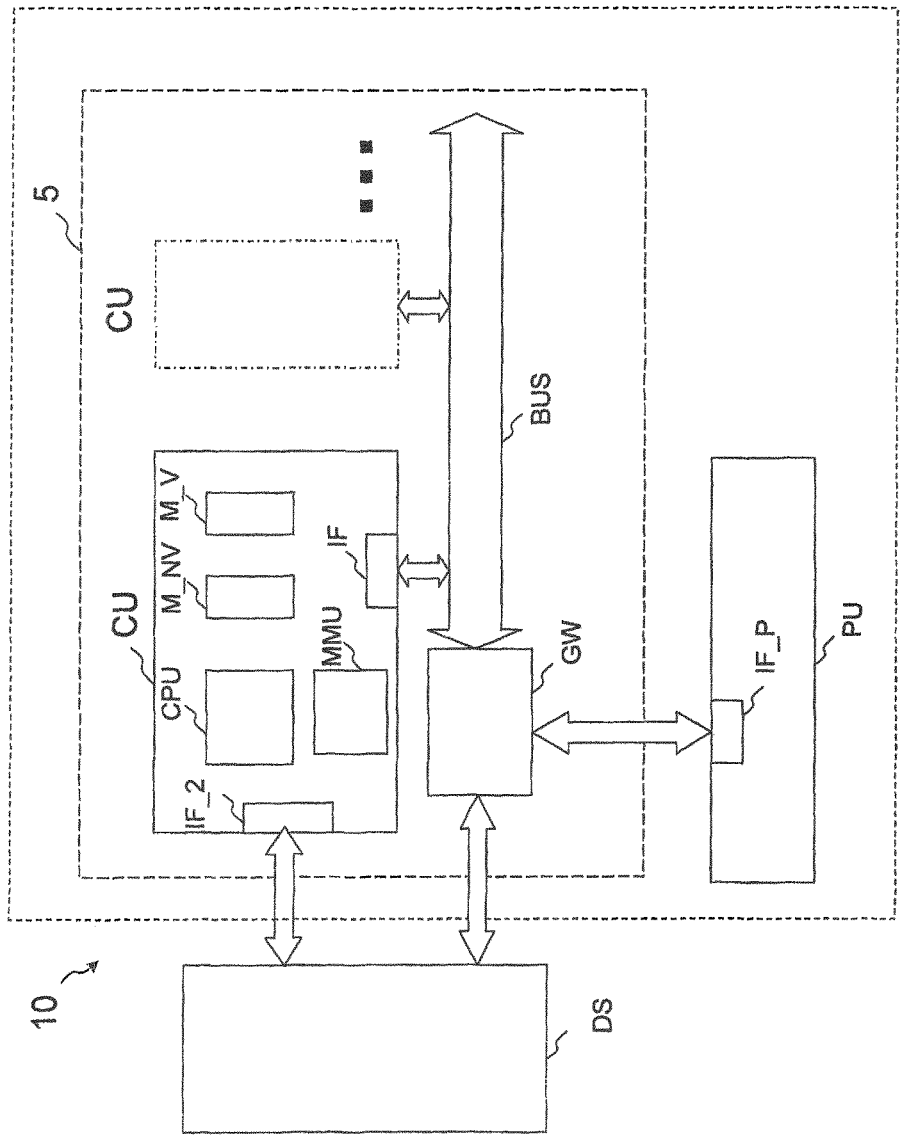

CONTROL UNIT FOR A MOTOR VEHICLE, PROGRAMMING UNIT AND PROGRAMMING SYSTEM

CROSS REFERENCE TO RELATED APPLICATIONS

This application is a continuation of PCT International Application No. PCT/EP2012/062977, filed Jul. 4, 2012, which claims priority under 35 U.S.C. §119 from German Patent Application No. 10 2011 079 402.6, filed Jul. 19, 2011, the entire disclosures of which are herein expressly incorporated by reference.

This application contains subject matter related to U.S. application Ser. No. 14/158,395, entitled "CONTROL UNIT FOR A MOTOR VEHICLE, PROGRAMMING UNIT AND PROGRAMMING SYSTEM," filed on even date herewith.

BACKGROUND AND SUMMARY OF THE INVENTION

The invention relates to a control unit for a motor vehicle, to a programming unit and to a programming system.

Modern motor vehicles have a plurality of program-controlled control units. The control units usually comprise a program memory, which can be programmed in an installed state of the control unit. In the case of today's control units, the program memory is frequently designed as a flash memory. Flash memories are non-volatile memory modules, in the case of which blank or deleted cells can be rewritten at any time but where the deleting of cells can only take place in segments. The control units frequently have a diagnostic interface by way of which the control unit can be coupled with a vehicle-independent diagnostic and/or testing device. During a reprogramming of the control units, a new version of the control unit software, for example, firmware, is in each case loaded into the control unit by means of the diagnostic and/or testing device.

With the rising functionality of the control units and a growing number of different control units, the data quantity of program codes, which has to be transmitted to the control units during the production and/or during a servicing, also increases.

It is an object of the invention to create control unit for a motor vehicle, a programming unit and a programming system which permit a flexible and/or reliable programming of the control unit.

This and other objects are achieved, according to a first aspect of the invention, by a control unit for a motor vehicle having a central processing unit, the central processing unit being designed for executing one or more control programs. The control unit further includes at least one communication interface for sending and receiving data and a program memory for storing program data of the respective control programs. For a programming of the control unit with program data, which are stored in a specified manner in the program memory, the control unit is designed for supporting a specified quantity of protocols. The control unit is designed for reading-in and analyzing a program data updating prompt for at least one control program to be updated, which prompt is provided at the communication interface. The program data updating prompt comprises at least a first indicator which represents conceivable protocols which can be used for the programming with updated program data of the respective control program. The control unit is also designed for, in each case, as a function of the first indicator, determining a second indicator, which represents that protocol from the quantity of protocols which is to be used for the programming of the control unit with the program data of the control program to be updated. The control unit is designed for sending, by way of the communication interface, in response to the program data updating prompt, a program data request, which comprises the second indicator.

In this case, "programming" means an importing of one or more control programs into the control unit such that the control unit can implement the respective control program. A conceivable protocol, which can be used for the programming of the control unit is the Unified Diagnostic Services Protocol (UDS Protocol). The UDS Protocol is a communication protocol that was developed for motor vehicles and permits a communication between the respective control unit and a unit outside the vehicle. For this purpose, the respective motor vehicle may have a diagnostic interface, which makes it possible to couple the unit to a vehicle data bus. It thereby becomes possible, for example, to retrieve a fault memory of the respective control unit and/or to load one or more control programs, particularly current firmware, into the program memory. The UDS Protocol can be used for simpler control units, which, for example, have a microcontroller and/or are designed as an embedded system. With the increasing functionality and complexity of the control units which, for example, have one or more processors and/or a different program memory structure, it may be necessary to use different protocols for the programming of the storage device in order to permit a reliable programming. A presetting of the protocol by the control unit makes it possible that, as a function of a specified hardware and software platform of the control unit, the protocol can be selected in an appropriate manner, so that a reliable, flexible and/or rapid programming of the control unit becomes possible. In this case, the control unit may be designed for directly receiving the program data from an appropriately designed programming unit, which is coupled with the control unit by way of the communication interface, and/or for downloading or requesting the program data from an external data source by using an address for establishing a connection between the control unit and the external data source.

According to a second aspect of the invention, a programming unit is provided for at least one control unit of a motor vehicle. The programming unit has a further communication interface by way of which the programming unit can be coupled with the respective control unit. Furthermore, the programming unit is designed for retrieving a program version of at least one control program of the respective control unit with which it is coupled, and when it recognizes that the at least one control program is not stored in a specified program version in the control unit, for sending a program data updating prompt for at least the one control program to be updated, by way of the further communication interface to the respective control unit. In this case, the program data updating prompt comprises at least a first indicator, which represents conceivable protocols that can be used for the programming with updated program data of the respective control program. The programming unit is further designed for analyzing a program data request provided in response to the program data updating prompt at the further communication interface, the program data request comprising a second indicator which represents a protocol selected by the respective control unit. The programming unit is further designed for indirectly and/or directly, as a function of the analyzing result, providing the programming with the current program data according to the respectively selected protocol.

When the providing is direct, the program data are provided by the programming unit and sent to the control unit. When the providing is indirect, the programming unit informs the control unit of an address of a data source from which the control unit can request and/or download the program data.

According to a third aspect of the invention, a programming system is provided which comprises at least one control unit according to the first aspect and one programming unit according to the second aspect, the programming unit being coupled with the respective control unit.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is a view of a first embodiment of a programming system according to the invention.

DETAILED DESCRIPTION OF THE DRAWING

The programming system 10 illustrated in FIG. 1 includes a vehicle-side system 5 and a programming unit PU outside the vehicle. The vehicle-side system 5 includes one or more control units CU and, for example, one or more vehicle data buses as well as a gateway GW. The gateway GW couples, for example, several vehicle data buses BUS, and/or the gateway GW permits a communication to communication units on the outside of the vehicle, for example, by use of a mobile radio connection. As an alternative, the vehicle-side system 5 may include several gateways GW.

The respective control unit CU includes a communication interface IF. By way of the communication interface IF, data can be sent as well as received by the control unit CU. The communication interface IF couples the control unit CU, for example, with the vehicle data bus BUS of the motor vehicle. The vehicle data bus is designed, for example, as a controller area network bus (CAN bus). However, in principle, other vehicle data buses known to a person skilled in the art are may be used.

The programming unit PU may, for example, be arranged in a testing and diagnostic device. The programming unit may be used, for example, in a vehicle production and/or a vehicle repair shop for the programming of at least a part of the control unit CU of the respective motor vehicles. The programming unit PU has, for example, a further communication interface IF_P by way of which the programming unit PU can be coupled with the respective control unit CU and/or the vehicle data bus BUS. By way of the further communication interface IF_P, data can be sent and received by the programming unit PU. The programming unit PU can, for example, communicate with the respective control unit CU by means of the gateway GW.

The control unit CU includes a central processing unit CPU. The central processing unit CPU may, for example, have a microcontroller and/or a microprocessor. The central processing unit CPU is designed for implementing programs and computations for controlling and/or automatically controlling other vehicle systems, for example, an engine control, an exhaust gas control and/or a vehicle dynamics control (ESP, electronic stability program).

The control unit CU further has a program memory M_NV. The central processing unit CPU is coupled with the program memory M_NV. In the program memory M_NV, program data of the respective control programs are stored which are implemented by the central processing unit CPU. The program memory M_NV is, for example, designed as a non-volatile memory, such as a flash memory. The program memory M_MV is, for example, designed in a reprogrammable manner in the sense that a control program previously stored in the program memory M_NV can first be at least partially deleted and a storage area that became vacant in the process can be newly written with program data of a more updated control program or another control program. The new programming, for example, of the flash memory, permits an elimination of faults as well as a retrofitting of new functions for the control unit CU. The program memory M_NV may also include a fault memory. Disturbances of the motor vehicle, for example, detected by the control unit CU and/or detected technical defects may be stored in the fault memory.

The control unit CU may, for example, have a volatile memory unit M_V, which is designed, for example, as a random access memory (RAM memory).

The program memory M_NV and/or the volatile storage unit M_V may be arranged in the microcontroller or the microprocessor. In principle, the program memory M_NV and/or the volatile memory unit M_V may also be arranged as external components outside the microcontroller or the microprocessor in the control unit CU.

The control unit CU is, for example, designed for analyzing a program data updating prompt provided at the communication interface IF for at least one control program to be updated. In this case, the program data updating prompt includes at least one address of an external data source DS independent of the control unit CU, from which, in each case, current program data of the control program to be updated can be requested. Furthermore, the control unit CU is designed for outputting a program data request for the respective current program data to the external data source DS by way of the communication interface IF and/or by way of a second communication interface IF_2. The control unit CU is further designed for reading-in and storing in the program memory M_NV the program data of the respective control programs which, in response to the program data request, are present at the communication interface IF and/or the second communication interface IF_2.

The control programs required for a programming of the respective control units CU can therefore be provided by different sources. The program data can, for example, be provided by the programming unit PU, and the control unit CU can be designed to request the program data from the programming unit PU. The address may, for example, have a source indicator (Uniform Resource Locator, URL). For example, the second communication interface IF_2 may comprise an air interface, so that the control unit CU can directly download the program data from the date source DS. As an alternative or in addition, the control unit CU may be designed for downloading the program data by way of the communication interface and the gateway GW. As an alternative or in addition, the address may comprise an identifier, such as an identification number or a number. In this case, the control unit CU can request the program data by way of the communication interface IF, the second communication interface IF_2 and/or by way of the gateway GW from the data source DS, which will then transmit the program data to the control unit CU. The data source DS may, for example, be designed as a server A server template, for example, can be used for transmitting the program data. For example, an application protocol, which is based on the Internet protocol (IP), can be used for transmitting the program data. Examples of such an application protocol are the hypertext transfer protocol (http), the hypertext transfer protocol secure (https), the file transfer protocol (ftp) and rsync.

The programming unit PU is, for example, designed corresponding to the control unit CU such that the programming unit PU can retrieve a program version of at least one control program of the respective control unit CU with which it is coupled, and, when it recognizes that the at least one control program is not stored in a specified version in the control unit CU, can send the program data updating prompt by way of the additional communication interface IF_P to the respective control unit CU. In this case, the program data updating prompt includes the at least one address of the external data source DS, which is independent of the control unit CU, from which data source DS, the current program data of the control program to be updated can be requested.

The control unit CU may further have a memory management unit MMU. The memory management unit MMU is designed, for example, for determining a storage area for the program data of the respective control programs, which are read in by way of the communication interface IF and/or the second communication interface IF_2. Furthermore, the memory management unit MMU is designed, for example, for storing the program data in the determined storage area and for providing the program data to the central processing unit CPU for its execution.

This permits a flexible management of the program memory M_NV of the respective control unit CU, for example, independently of a specified storage program of the external data source DS. The control unit CU may, for example, manage the program memory M_NV independently of a flash loader program. In the event that the external data source DS specifies the memory management, such a flash loader program can be sent, for example, from the external data source DS to the control unit CU. The flash loader program has a storing command sequence so that, during the implementation of the flash loader program, the program data to be stored will be stored in a specified manner in the program memory M_NV. In this case, the storing of the program data is specified by the external data source, which may also be the programming unit PU.

The control unit CU may be designed for recognizing in a specified manner compressed program data as such, which are read in by way of the communication interface IF and/or the second communication interface IF_2, and for uncompressing the compressed program data. For the compression of the data, a Huffman coding may, for example, be used. As an alternative, further compression methods known to a person skilled in the art may be used.

The control unit CU may further be designed for recognizing a container file as such which comprises one or more files with program data, and which is read in by way of the communication interface IF and/or the second communication interface IF_2, and for extracting the files from the container file. The container file may be designed, for example, as a compressed archive file. The container file may, for example, have a ZIP file format, a GZIP file format or a TAR file format.

The compressed program data and/or the container file may be provided, for example, by the programming unit PU and/or by the external data source DS.

The control unit CU is designed for supporting a defined quantity of protocols for a programming of the control unit CU with program data. Furthermore, the control unit CU is designed for reading-in and analyzing a further program data updating prompt for at least one control program to be updated which is provided at the communication interface IF. The further program data updating prompt comprises at least a first indicator which represents conceivable protocols that can be used for the programming with updated program data of the respective control program. The control unit CU is further designed for, in each case, as a function of the first indicator, determining a second indicator, which represents that protocol from the quantity of protocols which is to be used for the programming of the control unit CU with the program data of the control program to be updated. The control unit CU is designed for sending by way of the communication interface IF, in response to the further program data updating prompt, a further program data request, which includes the second indicator.

In this context, the programming unit PU is designed for sending, when it recognizes that the at least one control program is not stored in the defined program version in the control unit CU, the further program data updating prompt for at least the one control program to be updated by way of the additional communication interface IF_P to the respective control unit CU. In this case, the further program data updating prompt includes at least the first indicator, which represents conceivable protocols, which can be used for the programming with the updated program data of the respective control program. The programming unit PU is further designed for analyzing a further program data request provided in response to the program data updating prompt at the further communication interface IF_P, the further program data request including the second indicator, which represents the protocol selected by the respective control unit CU. The programming unit is further designed for indirectly and/or directly, as a function of the analyzing result, providing the programming with the current program data according to the respectively selected protocol.

Conceivable protocols are, for example, the UDS protocol and the hyper text transfer protocol (http).

For this purpose, it may first be provided that, during a preprocessing phase, the control unit CU and the programming unit PU communicate first by way of a first protocol, for example, the Unified Diagnostic Services Protocol (UDS Protocol). It may, for example, be provided that the UDS Protocol is expanded by a service for retrieving a desired protocol for the data exchange between the control unit CU and the programming unit PU, particularly, for the programming of the control unit CU. It may, for example, be provided that such a retrieval takes place individually for each control program that is to be updated. As an alternative, it is contemplated that such a retrieval takes place for several control programs that are to be updated. The first and the second indicator may, in each case, have a specified code which permits the determining of the conceivable or the desired protocol.

The programming unit preferably supports the protocols conceivable for the programming of the control unit CU, in which case, "supporting" means that the control unit CU is designed for indirectly and/or directly providing the programming with the current program data according to the respectively selected protocol.

The programming unit PU is, for example, designed such that, when the programming unit PU itself can carry out the programming of the control unit CU according to the desired protocol, this programming unit PU directly provides the programming of the respective control unit with the current program data according to the respectively selected protocol, for example, by a direct sending of the program data to the control unit CU. The programming unit PU may be designed, when it cannot itself carry out the programming according to the desired protocol, for sending, in response to the further program data request of the control unit CU, the program data updating prompt to the control unit CU, which includes at least the one address of the external data source DS, from which, in each case, the current program data can be requested according to the desired protocol by the control unit CU. In this case, the programming unit PU indirectly provides the programming with the current program data according to the respectively selected protocol. As an alternative or in addition, the programming unit PU may be designed for sending, independently of whether or not it can carry out the programming with the desired protocol, the program data updating prompt to the control unit CU in response to the further program data request of the control unit CU.

It may optionally be provided that, if required, the programming unit PU can ignore the selection of the protocol of the control unit CU and can use a different protocol, which the control unit CU also supports.

LIST OF REFERENCE SYMBOLS 5 vehicle-side system
10 programming system
BUS vehicle data bus
CPU central processing unit
CU control unit
DS external data source
GW gateway
IF communication interface
IF_2 second communication interface
IF_P further communication interface of the programming unit
M_NV program memory
M_V volatile memory unit
MMU memory management unit
PU programming unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit for a motor vehicle, comprising:
   at least one central processing unit, which is operatively configured for implementing one or more control programs;
   at least one communication interface for sending and receiving data;
   at least one program memory for storing program data of the respective control programs; and
   a memory management unit operatively configured for determining a storage area in the program memory for the program data of the respective control programs and providing the program data to the central processing unit for execution;
   wherein the control unit is operatively configured to:
      support a specified set of a plurality of protocols for the programming of the control unit with program data that are stored in a specified manner in the program memory,
      read-in and analyze a program data updating prompt for at least one control program to be updated, which program data updating prompt is provided at the communication interface, the program data updating prompt comprising at least a first indicator representing a plurality of conceivable protocols which are usable for the programming with updated program data of the respective control program,
      determine, depending upon the first indicator in each case, a second indicator, which represents that protocol from the set of the plurality of protocols that is to be used for the programming of the control unit with the program data of the control program to be updated,
      send, by way of the communication interface, in response to the program data updating prompt, a program data request, which comprises the second indicator, and
      when the control unit cannot be directly provided with the current program data, receive, by way of the communication interface, the program data updating prompt, including an address of an external data source from which the current program data is retrievable.

2. A programming unit for at least one control unit of a motor vehicle, comprising:
   a programming unit communication interface by way of which the programming unit is coupleable with a respective control unit, wherein the programming unit is operatively configured to:
      retrieve a program version of at least one control program of the respective control unit with which it is coupled,
      when the programming unit recognizes that the at least one control program is not stored in a specified program version in the control unit, send a program data updating prompt for at least the one control program to be updated by way of the programming unit communication interface to the respective control unit, the program data updating prompt comprising at least a first indicator, which represents a plurality of conceivable protocols usable for the programming with updated program data of the respective control program,
      analyze a program data request provided in response to the program data updating prompt at the programming unit communication interface to produce a result of analyzing the program data request, the program data request comprising a second indicator which represents a protocol selected by the respective control unit from the plurality of conceivable protocols, and
      provide the programming with the current program data according to the respectively selected protocol either directly or indirectly, based on the result of analyzing the program data request;
   wherein, when the result of analyzing the program data request indicates that the programming unit cannot directly provide the programming with the current program data, the programing unit sends the program data updating prompt, including an address of an external data source from which the current program data is retrievable, to the control unit.

3. A programming system, comprising:
   a control unit for a motor vehicle, comprising:
      at least one central processing unit, which is operatively configured for implementing one or more control programs;
      at least one communication interface for sending and receiving data;

at least one program memory for storing program data of the respective control programs;

a memory management unit operatively configured for determining a storage area in the program memory for the program data of the respective control programs and providing the program data to the central processing unit for execution;

wherein the control unit is operatively configured to:

support a specified set of a plurality of protocols for the programming of the control unit with program data that are stored in a specified manner in the program memory, read-in and analyze a program data updating prompt for at least one control program to be updated, which program data updating prompt is provided at the communication interface, the program data updating prompt comprising at least a first indicator representing a plurality of conceivable protocols which are usable for the programming with updated program data of the respective control program, determine, depending upon the first indicator in each case, a second indicator, which represents that protocol from the set of the plurality of protocols that is to be used for the programming of the control unit with the program data of the control program to be updated, and send, by way of the communication interface, in response to the program data updating prompt, a program data request, which comprises the second indicator; and a programming unit coupled with the control unit, the programming unit comprising:

a programming unit communication interface by way of which the programming unit is coupleable with a respective control unit, wherein the programming unit is operatively configured to:

retrieve a program version of at least one control program of the respective control unit with which it is coupled, when the programming unit recognizes that the at least one control program is not stored in a specified program version in the control unit, send a program data updating prompt for at least the one control program to be updated by way of the programming unit communication interface to the respective control unit, the program data updating prompt comprising at least a first indicator, which represents the plurality of conceivable protocols usable for the programming with updated program data of the respective control program, analyze a program data request provided in response to the program data updating prompt at the programming unit communication interface to produce a result of analyzing the program data request, the program data request comprising a second indicator which represents a protocol selected by the respective control unit, and provide the programming with the current program data according to the respectively selected protocol either directly or indirectly, based on the result of analyzing the program data request;

wherein, when the result of analyzing the program data request indicates that the programming unit cannot directly provide the programming with the current program data, the programing unit sends the program data updating prompt, including an address of an external data source from which the current program data is retrievable, to the control unit.

4. A method of operating a control unit of a motor vehicle for programming the control unit with program data, which control unit supports a specified set of a plurality of protocols for the programming of the control unit with program data that are stored in a specified manner in a program memory of the control unit, the method comprising the acts of:

reading-in and analyzing a program data updating prompt for at least one control program of the control unit to be updated, said program data updating prompt being provided at a communication interface of the control unit, wherein the program data updating prompt comprises at least a first indicator representing a plurality of conceivable protocols usable for the programming with updated program data of the respective control program;

determining a second indicator, as a function of the first indicator, said second indicator representing that protocol from the specified set of the plurality of protocols to be used for the programming of the control unit with the program data of the control program to be updated;

sending, by way of the communication interface, a program data request in response to the read-in program data updating prompt, the program data request comprising the second indicator; and when the control unit cannot be directly provided with the current program data, receiving, by way of the communication interface, the program data updating prompt, including an address of an external data source from which the current program data is retrievable; and retrieving the current program data from the address of the external data source for execution by a central processing unit.

* * * * *